Aug. 10, 1948.  L. R. ALLISON  2,446,624

REACTANCE DEVICE

Filed April 10, 1946

INVENTOR.
Leslie R. Allison.
BY
*A. L. Vencill*
HIS ATTORNEY.

Patented Aug. 10, 1948

2,446,624

UNITED STATES PATENT OFFICE 2,446,624

REACTANCE DEVICE

Leslie R. Allison, Forest Hills, Pa., assignor to The Union Switch & Signal Company, Swissvale, Pa., a corporation of Pennsylvania Application April 10, 1946, Serial No. 660,981

1 Claim. (Cl. 171—242)

My invention relates to reactance devices, and particularly to reactors of the iron core type.

When an iron core reactor is used with a fixed capacitance to obtain resonance at a given frequency, the method of tuning usually followed is to keep the number of turns in the reactor fixed and vary the air gap in the reactor core.

One object of my invention is to provide novel and improved means to permit ready and accurate adjustment of the air gap in the core of a reactor of the type described in a manner which will enable the circuit in which the reactor is to be used to be quickly tuned to exact resonance.

My present invention is an improvement upon that described in my prior Patent No. 1,869,364, granted on April 2, 1932, for a reactor.

According to my invention, the reactor core is made up of two core members mounted with their leg ends confronting each other so as to form an air gap between them. Attached to each core member is a post provided with a screw threaded hole which aligns axially with a hole in a post attached to the other core member. The screw threaded holes receive threaded portions provided on the opposite ends of an adjusting screw or stud in such manner that by turning the adjusting screw in one direction the core members will be forced apart, whereas by turning the adjusting screw in the other direction the core members will be pulled together. The desired adjustment can be made by threading the two ends of the screws in opposite directions with very fine pitched threads, but the best results are obtained when the two ends of the screws are threaded in the same directions with threads having different pitches as will appear hereinafter.

Other objects and characteristic features of my invention will become apparent as the description proceeds.

I shall describe one form of reactor embodying my invention, and shall then point out the novel features thereof in claims.

Figure 1:
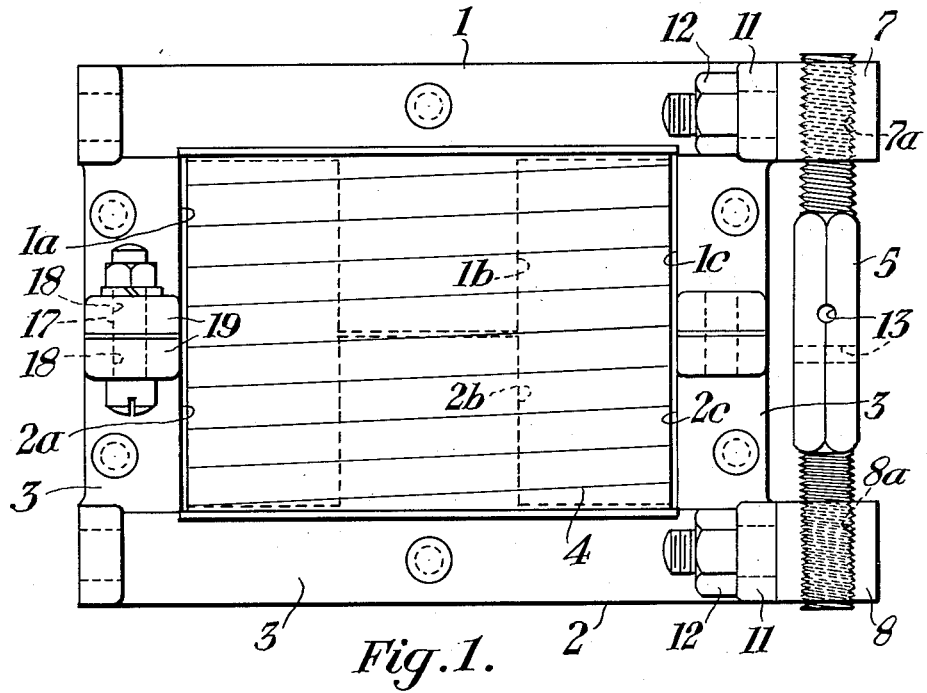
Figure 2:
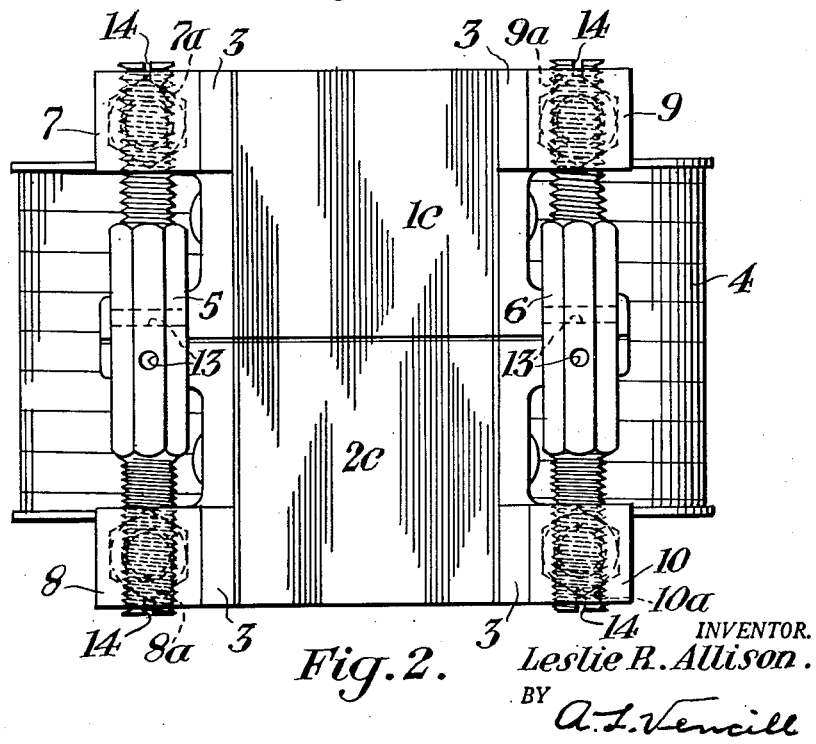

In the accompanying drawings, Figs. 1 and 2 are side and end elevational views, respectively, showing a reactor provided with adjusting means embodying my invention.

Similar reference characters refer to similar parts in both views.

Referring to the drawing, the reactor here shown comprises a shell type iron core made up of two three legged core members 1 and 2 mounted with their legs 1a2a, 1b2b and 1c2c in confronting relation in such manner that by moving the core members apart air gaps can be provided between the leg ends to vary the permeability of the core, as will be obvious. The two core members may be alike, and each comprises a plurality of E-shaped laminations clamped as by riveting between two non-magnetic end brackets 3. The central core legs 1b2b are surrounded by a winding 4. This winding may be either a single reactor winding or the primary and secondary windings of a reactance type transformer. It will be apparent that the inductance of the winding 4 will depend upon the permeability of the core, and may therefore readily be varied by varying the air gaps between the core legs.

In accordance with my present invention, in order to conveniently and easily effect an accurate and precise adjustment of the air gaps between the core legs, I provide at one end of the core two adjusting screws or studs 5 and 6. These screws are threaded at each end, and the one screw 5 is screwed at its ends into aligned threaded holes 7a and 8a provided in corner posts 7 and 8 secured respectively to the core members 1 and 2 at one side of the core while the other adjusting screw 6 is screwed at its ends into threaded holes 9a and 10a provided in corner posts 9 and 10 secured respectively to the core members 1 and 2 at the other side of the core. The corner posts may be secured to the associated core members in any desired manner, but as here shown they are secured to the core members by integral shank portions which extend through apertured lugs 11 provided on the clamping brackets 3 and receive nuts 12 screwed onto the threaded ends of the shank portions of the corner posts. The threaded shank portions of the corner posts are preferably machined for a snug fit in the apertures in the lugs 11 to preclude the possibility of changes taking place in the core adjustment after an adjustment has once been made.

The threads on the opposite ends of the adjusting screws are so arranged that by turning the adjusting screws in one direction the core members 1 and 2 will be forced apart, whereas by turning these screws in the other direction the core members will be pulled together. To facilitate turning the screws the central shank portions of the screws are preferably made polygonal in shape to provide a wrench grip, and may in addition be drilled with one or more holes 13 to receive the end of a rod. Furthermore, if desired a saw kerf 14 or the like may be provided in either or both ends of the adjusting screws for the reception of a screw driver.

The adjusting screws may if desired be threaded at their opposite ends in opposite directions with very fine pitch threads, but the best results are obtained when the two ends of the screws are threaded in the same direction but with threads having different pitches. For example, one end of each screw may be provided with 24 threads per inch and the other end of each screw with 32 threads per inch in which event one complete revolution of the adjusting screw will result in a change in the distance between the corner posts into which the screw is screwed equal to the differences between $\frac{1}{24}$ and $\frac{1}{32}$ of an inch or 0.0104 inch. The change in mean air gap for the core as a whole will be considerably less because of the proportional distance of the air gaps from the mean center line of movement.

An adjusting screw assembly similar to either of those just described may be applied to one, two, three or four corners of the reactor core, if desired. In practice, however, it will usually be found sufficient to provide only two adjusting screw assemblies at one end of the core as shown, and to clamp the cores together at the other end with a fixed spacer between the adjacent core legs. The means illustrated for clamping the cores together is well known, and comprises two clamping bolts 17 (only one of which is visible in the drawing) which pass through aligned holes 18 provided in laterally projecting lugs 19 formed on the clamping brackets on each side of the core.

It should be particularly pointed out that with the adjusting means constructed in the manner described the air gaps between the core legs can be adjusted continually and precisely by turning the adjusting screws either by means of a wrench placed on the central shank portions of the screws, or by means of a length of rod inserted in one of the two holes 13 drilled at right angles to each other in the central shank portions of the screws, or by means of a screw driver inserted in the saw kerf 14 at either end of the adjusting screws. The large number of threads of small clearance in engagement between the adjusting screws and associated lugs makes further locking unnecessary after tuning is accomplished. If desired, however, any possible play in the threads can be taken up by providing additional clamping bolts at the ends of the core nearest the adjusting screw similar to those provided at the other end of the core, or clamping nuts may be placed on the adjusting screws between the central shank portions and the associated corner posts. These nuts when provided would be loosened before an adjustment is made, and tightened upon completion of the adjustment. After an adjustment has been made wire seals can be threaded through the holes 13 in the adjusting screws to prevent unauthorized changing of the air gap adjustment.

It should be clearly understood that while I have shown my invention applied to a three legged core of the shell type, it can readily be applied to any core having relatively movable core members, relative movement of which is desired to enable the air gap between the core members to be varied.

Although I have herein shown and described only one form of the reactor device embodying my invention, it is understood that various changes and modifications may be made therein within the scope of the appended claim without departing from the spirit and scope of my invention.

Having thus described my invention, what I claim is:

In a reactance device comprising two core members separated by an air gap which can be adjusted to vary the reactance of said device by moving one core member relative to the other, the means for moving said one core member relative to said other core member to effect an accurate and precise adjustment of said air gap comprising a first post member removably secured to one of said core members, a second post member removably secured to the other said core member, and an adjusting member provided with a screw threaded connection with each of said first and second post members in such manner that by turning said adjusting member said core members may be moved relative to each other to vary the air gap between them, said threaded connections being threaded in the same directions with threads having different pitches, whereby the change in air gap which results from each revolution of said adjusting member will be a function of the difference in pitch between the threads on said threaded connections.

LESLIE R. ALLISON.

REFERENCES CITED

The following references are of record in the file of this patent:

UNITED STATES PATENTS

| Number | Name | Date |
| --- | --- | --- |
| 83,225 | Tudor | Oct. 20, 1868 |
| 1,637,404 | Hunt | Aug. 2, 1927 |
| 1,925,224 | Alder | Sept. 5, 1933 |
| 1,991,400 | Littmann | Feb. 19, 1935 |
| 2,086,316 | Holslag | July 6, 1937 |